April 14, 1970 R. O. WINDER 3,506,817

BINARY ARITHMETIC CIRCUITS EMPLOYING THRESHOLD GATES IN WHICH BOTH THE SUM AND CARRY ARE OBTAINED IN ONE GATE DELAY INTERVAL

Filed Feb. 24, 1967 3 Sheets-Sheet 1

Inventor:
ROBERT O. WINDER
BY [signature]
Attorney

April 14, 1970 R. O. WINDER 3,506,817

BINARY ARITHMETIC CIRCUITS EMPLOYING THRESHOLD GATES IN WHICH BOTH THE SUM AND CARRY ARE OBTAINED IN ONE GATE DELAY INTERVAL

Filed Feb. 24, 1967 3 Sheets-Sheet 2

Inventor:
ROBERT O. WINDER
By [signature]
Attorney

Inventor:
ROBERT O. WINDER
By [signature]
Attorney

United States Patent Office 3,506,817
Patented Apr. 14, 1970

3,506,817

BINARY ARITHMETIC CIRCUITS EMPLOYING THRESHOLD GATES IN WHICH BOTH THE SUM AND CARRY ARE OBTAINED IN ONE GATE DELAY INTERVAL

Robert O. Winder, Trenton, N.J., assignor to RCA Corporation, a corporation of Delaware Filed Feb. 24, 1967, Ser. No. 618,508
Int. Cl. G06f 7/385
U.S. Cl. 235—176 8 Claims

ABSTRACT OF THE DISCLOSURE

This disclosure relates to binary arithmetic circuits employing threshold gates. In particular, the disclosure relates to fast binary adders and to multipliers implemented with such adders.

BACKGROUND OF THE INVENTION

Threshold gates such as majority gates, minority gates, weighted input threshold gates and the like may be employed in the design of binary adders which are simple in structure and which have other attributes. Such adders are described in Harel Patents Nos. 3,113,206, issued Dec. 3, 1963, and 3,088,668, issued May 7, 1963, and in copending application Ser. No. 609,959 titled, "Binary Multipliers," filed by Mao C. Wang on or about Jan. 17, 1967, and assigned to the same asignee as the present application. In all of these adders, the carry is obtained after one or more threshold gate delay interval and the sum is obtained after two or more threshold gate delay intervals.

SUMMARY OF THE INVENTION

The adders of the present invention have the important advantage that both the sum and carry are obtained in one gate delay interval. These adders include a plurality of threshold gates, means coupled to the gates for applying thereto, in parallel, signals indicative of a plurality of bits to be added, and means for deriving from the gates in one gate delay interval a first signal indicative of the carry of said bits and a group of signals indicative of the sum of said bits.

DETAILED DESCRIPTION

The blocks making up the figure are circuits which receive electrical signals indicative of binary digits (bits) and which produce output signals indicative of bits. For the sake of brevity in the explanation which follows, rather than speaking of the signal which represents the binary digit 1 or 0, the bit itself is sometimes referred to.

Figures 1, 2, 3:
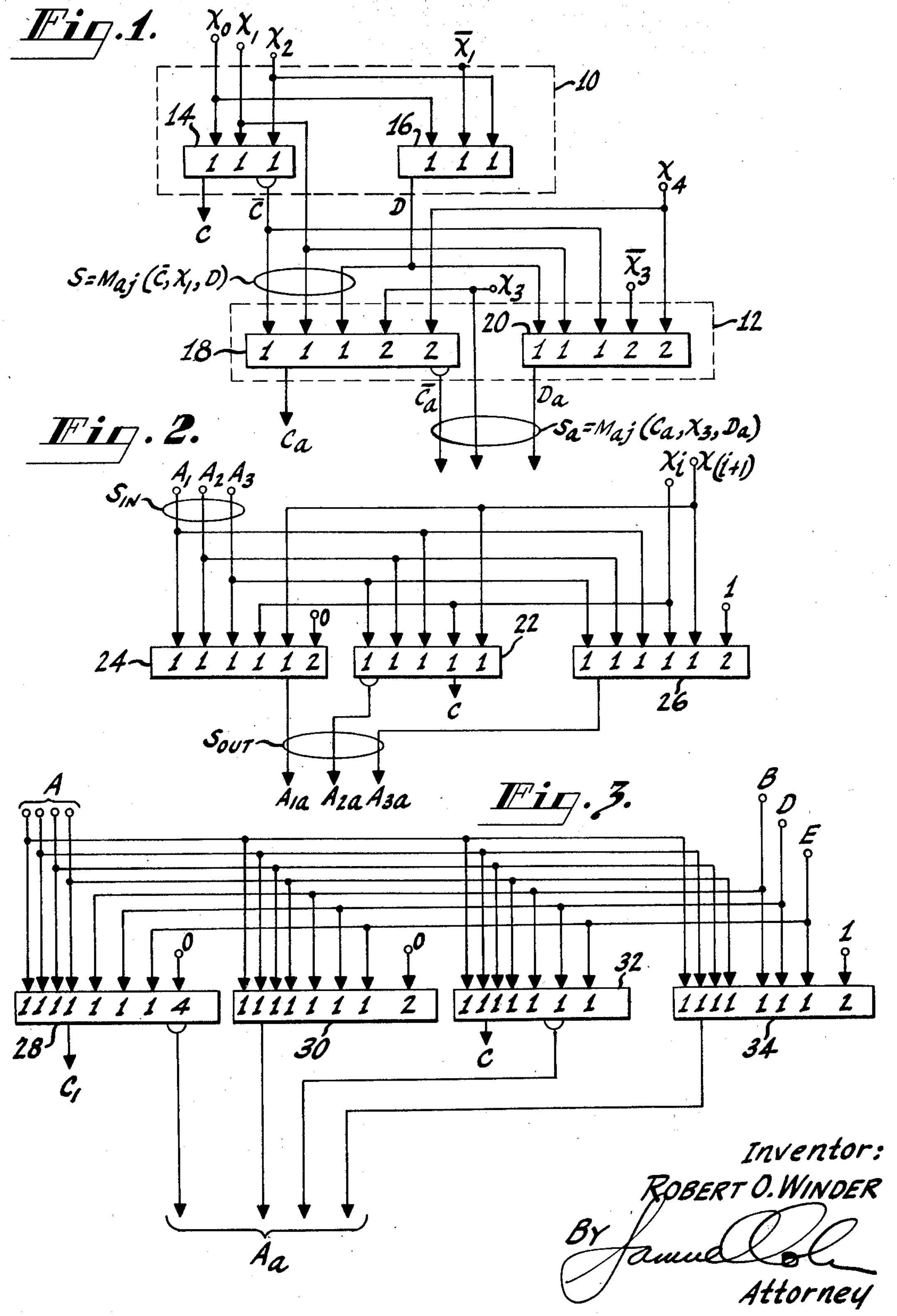
FIGURE 1 is a block circuit diagram of two stages of an adder circuit according to the invention.
FIGURE 2 is a block diagram of another form of adder stage according to the invention.
FIGURE 3 is a block diagram of another form of adder stage according to the invention.

The circuit of FIGURE 1 comprises two adder stages shown within dashed blocks 10 and 12, respectively. Adder stage 10 comprises two 3-input threshold gates 14 and 16, respectively, commonly known as majority gates. Each such gate has a threshold of 2 and each input is assigned the weight 1. Therefore, the value of the uncomplemented output C is equal to that of the majority of the inputs. The value of a complemented output, such as $\overline{C}$, is equal to that of the minority of the inputs.

Stage 12 comprises two weighted input threshold gates 18 and 20, respectively. Each such gate has 5 inputs assigned respective weights 2,2,1,1,1 and each such gate has a threshold of 4. Weighted gates of this type are discussed in the copending Wang application above and circuits for implementing such gates are discussed in the references cited in the Wang application. In such gates, a signal applied to a weight 2 input terminal has twice as much effect on the operation of the gate as a signal applied to a weight 1 input terminal thereof.

Before discussing the operation of the circuit of FIGURE 1, it may be in order at this point to discuss binary arithmetic generally. Table I below is the truth table for the addition of a group of binary digits. It shows, for example, that when there is an odd number of ones in the group of bits being added to one another, the sum is a 1 and when there is an even number of ones, the sum is a 0. It also shows that when two or more of the bits being added have the value 1, the first carry C is a 1 and when four or more of the bits being added have the value 1, then the second carry is also a 1. For greater numbers of inputs of value one, there are additional carries (six ones requires three carries, eight requires four carries and so on).

TABLE I

| Number of Input 1's | S | C | $C_1$ |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 1 | 1 |
| 5 | 1 | 1 | 1 |

Returning to FIGURE 1, stage 10 can be shown to be a 3-input adder (sometimes known as a "full adder") where $x_0$, $x_1$, $x_2$ are the three bits being added and $\overline{x}_1$ is the complement of $x_1$. It can be seen by inspection that when two or three of these bits have the value 1, C, the output of majority gate 14, is a 1 as it should be. The output of stage 16, that is D, is equal to 1 when the majority of $x_0$, $\overline{x}_1$ and $x_2$ are 1.

The sum output S of the circuit is represented by the three signals $\overline{C}$, $x_1$ and D which appear on three separate wires. This sum S is generated concurrently with the carry C in one delay interval and its value is defined by the equation $S=\text{Maj}(\overline{C},x_1,D)$. In other words, S is 1 only when 2 or 3 of $\overline{C}$, $x_1$ and D have the value 1 and is 0 only when two or three of these same bits have the value 0.

The truth table defining the operation of the stage 10 is:

TABLE II

| $x_0$ | $x_1$ | $x_2$ | C | D | S |
|---|---|---|---|---|---|
| 0 | 0 | 0 | 0 | 0 | 0 |
| 0 | 0 | 1 | 0 | 1 | 1 |
| 0 | 1 | 0 | 0 | 0 | 1 |
| 0 | 1 | 1 | 1 | 0 | 0 |
| 1 | 0 | 0 | 0 | 1 | 1 |
| 1 | 0 | 1 | 1 | 1 | 0 |
| 1 | 1 | 0 | 1 | 0 | 0 |
| 1 | 1 | 1 | 1 | 1 | 1 |

It may be in order at this point to raise the question whether a group of three signals which represent a sum, even though they arrive in only one stage delay, can result in any saving in time during the performance of an addition operation. In the cases where it is necessary to decode these three signals by applying them to an additional majority gate, an additional stage delay occurs. Here, the circuit is no faster than many of the circuits of the references. However, the applicant has invented a number of circuits where the three signals may be used directly without any necessity for decoding. In such circuits the adders of the invention are twice as fast as the fastest ones of the references, assuming the use of threshold gates of comparable speeds.

Stage 12 of FIGURE 1 is one example of a circuit which employs the three signals indicative of a sum directly. These three signals $\overline{C}$, $x_1$ and D are applied in parallel to the three weight 1 input terminals of gates 18 and 20, respectively. These three signals represent one bit. The second bit applied to stage 12 is $x_3$ and its complement ($\overline{x}_3$) and the third bit applied to stage 12 is $x_4$. The $x_3$ and $x_4$ bits are applied to the two weight 2 input terminals, respectively, of gate 18; the $\overline{x}_3$ and $x_4$ bits are applied to the two weight 2 input terminals, respectively, of gate 20. It might be mentioned here, as an aside, that a bit and its complement, when needed, are generally concurrently available in data processing systems. For example, in a conventional machine, they may be present at the 1 and 0 output terminals of a register stage. In a threshold gate machine, the bit and its complement may be available at the two output terminals of a threshold gate logic and/or storage stage.

The operation of stage 12 is given in Table III below. It may be observed from the table that the carry output $C_a$ is obtained in one gate delay interval after the inputs are applied to stage 12 and that the sum output $S_a$, again consisting of signals on three separate wires, is also obtained in one stage delay. As in the case of the sum output of stage 10, the sum output of stage 12 is $$S_a = \text{Maj}(\overline{C}_a, x_3, D_a)$$

TABLE III

| S | $x_3$ | $x_4$ | $C_a$ | $D_a$ | $S_a$ |
|---|---|---|---|---|---|
| 0 | 0 | 0 | 0 | 0 | 0 |
| 0 | 0 | 1 | 0 | 1 | 1 |
| 0 | 1 | 0 | 0 | 0 | 1 |
| 0 | 1 | 1 | 1 | 0 | 0 |
| 1 | 0 | 0 | 0 | 1 | 1 |
| 1 | 0 | 1 | 1 | 1 | 0 |
| 1 | 1 | 0 | 1 | 0 | 0 |
| 1 | 1 | 1 | 1 | 1 | 1 |

The correctness of the operation of stage 12 of FIGURE 1 readily may be checked by comparing Table III with Table I. For example, line 1 of Table III indicates that $S_a$ is 0 when S is 0 and $x_3$ and $x_4$ are both 0. S is 0 only when an even number 0 or 2 of the bits $x_0$, $x_1$, $x_2$ have the value 1. In either of these cases, if both $x_3$ and $x_4$ are 0, then there still is an even number of the five bits $x_0 \ldots x_4$, which have the value 1 so that $S_a$ should be 0. The same analysis holds for line 4 of Table III, since if both $x_3$ and $x_4$ are 1 and there are already an even number of ones in $x_0 \ldots x_2$, then there still is an even number of ones. As one final example, line 2 of the table indicates that if $x_4$ is a 1 and $x_3$ is a 0 and S is a 0, then $S_a$ is a 1. This is correct since when S is a 0 there is an even number of ones present among $x_0 \ldots x_2$ and if an odd number of ones (only $x_4=1$) is added to this then the result must be an odd number of ones so that $S_a$ must be 1. A similar analysis may be made to show that the values given for the carries are also correct.

Another form of 3-input adder according to the invention is shown in FIGURE 2. This adder consists of three gates 22, 24 and 26. Gate 22 is a 5-input majority gate and gates 24 and 26 are each 6-input gates with input weights 2,1,1,1,1,1 and with a threshold of 4.

The adder of FIGURE 2 like the adder stage 12 of FIGURE 1 adds three bits. One of the bits is represented by the code $A_1A_2A_3$ appearing on three separate wires. If these three wires together carry a single 1, this represents the bit 0. If the three wires together carry two 1's, this represents the bit 1. In this particular circuit, the condition of no 1's or three 1's never occurs. The second bit applied to the circuit of FIGURE 2 is $x_1$ and the third bit is $x_{(1+1)}$. In addition to these inputs, the gate 24 receives a constant bias of 0 applied to a weight 2 input terminal thereof and gate 26 receives a constant bias of 1 at its weight 2 input terminal.

The operation of the circuit of FIGURE 2 is given in Table IV below.

TABLE IV

| $S_{IN}$ | Number of 1's from previous stage | $xi$ | $xi_{+1}$ | C | $A_{1a}$ | $A_{2a}$ | $A_{3a}$ | Number of 1's in output | $S_{OUT}$ |
|---|---|---|---|---|---|---|---|---|---|
| 0 | 1 | 0 | 0 | 0 | 0 | 1 | 0 | 1 | 0 |
| 0 | 1 | 0 | 1 | 0 | 0 | 1 | 1 | 2 | 1 |
| 0 | 1 | 1 | 0 | 0 | 0 | 1 | 1 | 2 | 1 |
| 0 | 1 | 1 | 1 | 1 | 0 | 0 | 1 | 1 | 0 |
| 1 | 2 | 0 | 0 | 0 | 0 | 1 | 1 | 2 | 1 |
| 1 | 2 | 0 | 1 | 1 | 0 | 0 | 1 | 1 | 0 |
| 1 | 2 | 1 | 0 | 1 | 0 | 0 | 1 | 1 | 0 |
| 1 | 2 | 1 | 1 | 1 | 1 | 0 | 1 | 2 | 1 |

A comparison of Table IV with Table I will show that the circuit does in fact perform 3-bit addition. Gate 22 generates the carry bit and the sum bit is represented by the signals $A_{1a}$, $A_{2a}$ and $A_{3a}$ appearing on three separate wires. As in the case of the input, when solely one of the three wires carries the bit 1, this represents the sum of 0 and when solely two of the wires carry the bit 1, this represents the sum of 1. Also, as in the case of the input, the conditions in which none of these three output wires carry a 1 or all three carry a 1 never exist.

The adder of FIGURE 2 is more complex than stage 12 of FIGURE 1 in that it requires three threshold gates rather than 2. However, the principles employed to design the adder of FIGURE 2 may be applied to the design of four or higher number of input adders. One such circuit is shown in FIGURE 3. This circuit includes four threshold gates 28, 30, 32 and 34, respectively. Gates 30 and 34 are 8 input threshold gates with input weights 2,1,1,1,1,1,1,1, and a threshold of 5; gate 28 is an 8 input threshold gate with input weights 4,1,1,1,1,1,1,1, and a threshold of 6; and gate 32 is a 7 input majority gate. Gate 28 has an 0 bias applied to the weight 4 input terminal thereof; gate 30 has a 0 bias applied to the weight 2 input terminal thereof; gate 34 has a 1 bias applied to the weight 2 input terminal thereof.

The adder of FIGURE 3 adds four bits. The first bit A consists of the signals appearing on four separate input lines and the second, third and fourth bits are B, D and E, respectively. The coding of bit A is such that when solely two of the wires carry 1, the bit represented is a 0 and when solely three of the wires carry a 1, the bit represented is a 1. The conditions when exactly 0, exactly 1 or exactly four 1's are present on the four wires do not occur in this circuit. In a similar manner, the output sum bit produced is represented by an analogous code on the four output wires legend $A_a$. As there are four input bits, two separate carries are possible. When two or more of the input bits have the value 1, C is a 1 and when all four of the input bits have the value 1, then $C_1$ is also a 1.

The concepts made use of in the design of the three and four bit circuits of FIGURES 2 and 3 are also applicable to the design of circuits having more than four input bits. In such circuits, $n$ threshold gates are needed for $n$ input bits.

One input, as well as the output, is encoded on $n$ lines, where the value 0 is denoted by the presence of $[n/2]$ 1's on the group of lines ($[x]$ is the largest integer no greater than $x$), and value 1 is represented by the presence of $([n/2]+1)$ 1's on the group of wires. No other cases occur. The bundle of $n$ inputs, along with $n-1$ additional inputs representative of the other $n-1$ input bits to the adder are applied with weight 1 to each gate. In addition, the first gate of the $n$ (counting from the left, say) has a bias signal 0 applied with weight 2 $[n/2]$, the next with weight 2 $[n/2]-2$, and so, until the $([n/2]+1)$'st gate, which has no bias input, then the $([n/2]+2)$'nd gate has a bias 1 applied with weight 2, the next gate has bias 1 applied with weight 4, and so on to the $n$'th gate which has bias 1 applied with weight $2n-2[n/2]-2$.

Successive carry signals are generated by the second, fourth, etc., gates, counting in the reverse direction (say from the right). The sum output is provided by the outputs of the first, third, fifth, etc., gates and the complemented outputs of the second, fourth, etc., gates, in each case counting from the right.

The Wang application above discloses a 3 by 3 multiplier which operates in the way shown in Table V below.

TABLE V

| | | | | | | |
|---|---|---|---|---|---|---|
| | | | $y_2$ | $y_1$ | $y_0$ | |
| | | | $x_0y_2$ | $x_0y_1$ | $x_0y_0$ | $x_0$ |
| | | $x_1y_1$ | $x_1y_1$ | $x_1y_0$ | | $x_1$ |
| | $x_2y_2$ | $x_2y_1$ | $x_2y_0$ | | | $x_2$ |
| $C_5$ | $C_4$ | $C_3$ | $C_2$ | | | |
| | $C_{4a}$ | $C_{3a}$ | | | | |
| $S_5$ | $S_4$ | $S_3$ | $S_2$ | $S_1$ | $S_0$ | |

In the operation depicted in Table V, the circuit obtains a logical product of $x_0$ and $y_0$ and this is the final product bit of least significance $S_0$. The circuit obtains the logical products of $x_0$ and $y_1$ and the logical product of $x_1$ and $y_0$ and adds these two quantities directly to obtain the final product bit $S_1$ of next significance and a carry bit $C_2$ and so on.

Figure 4:
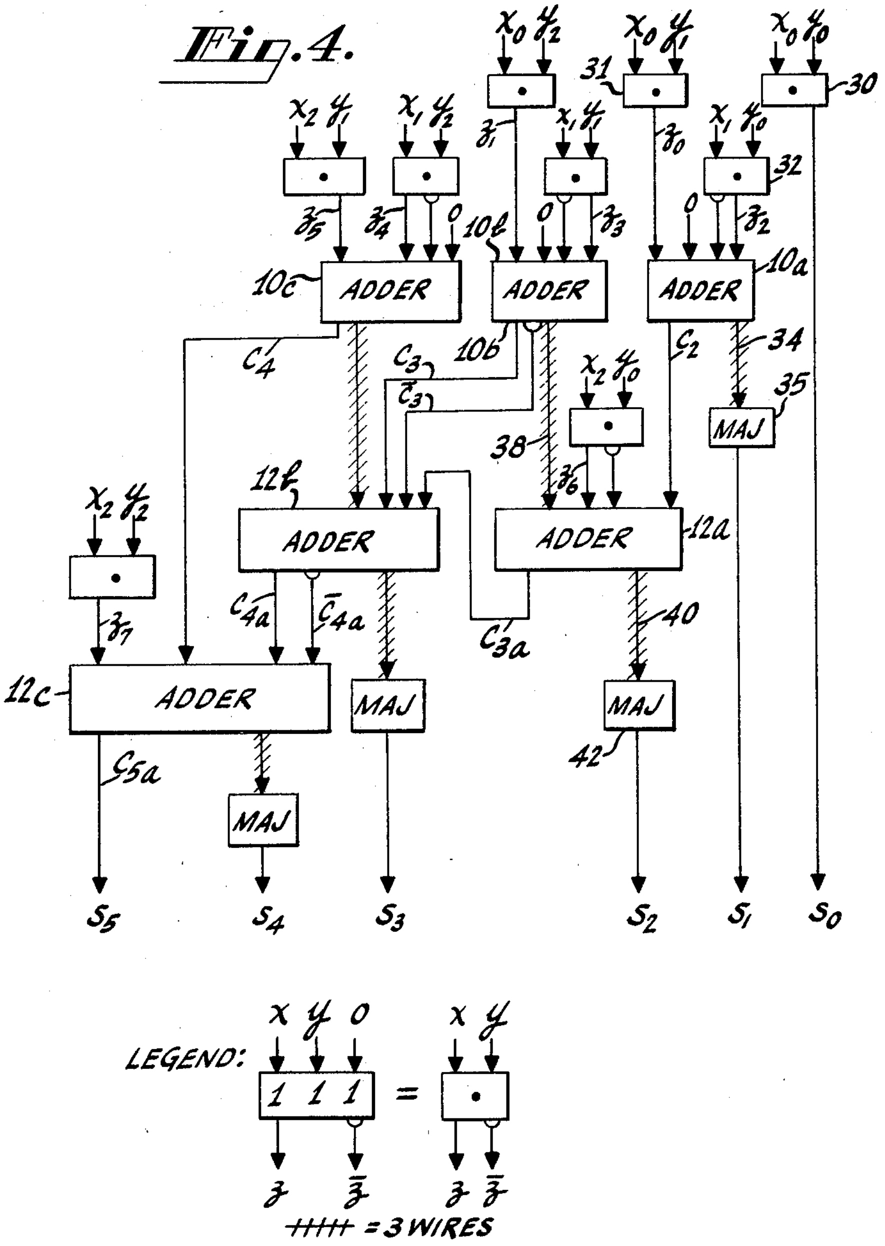
FIGURE 4 is a block diagram of a multiplier employing the adder stages of FIGURE 1.

The circuit of FIGURE 4, which employs the adder stages of FIGURE 1, performs the 3 by 3 multiplication described in Table IV above and does so in fewer stage delays than the Wang multiplier. It does so because each adder generates a sum in only one stage delay rather than the two required in the Wang circuit. (The saving in time relative to the Wang multiplier increases as the number of bits in the operands increase.)

In the operation of the multiplier of FIGURE 4, the bits $x_0$, $y_0$ are applied to AND gate 30 to obtain the first final product bit $S_0$. AND gate 31 obtains the logical product of $z_0$ of $x_0$ and $y_1$, and AND gate 32 obtains the logical product $z_2$ and its complement of the bits $x_1$ and $y_0$. Note that in a preferred form of the invention the AND gates are implemented by threshold gates as indicated in the legend.

The adder 10a corresponds to stage 10 of FIGURE 1. It receives the bit $z_0$ and the bit $z_2$ and its complement $\overline{z_2}$ and receives as a third input the constant bias 0. It readily can be shown that when the third bit applied to the adder 10a is a 0, the adder does add the remaining two bits it receives (it operates as a "half adder"). The adder produces a carry $C_2$ and a sum which is represented by the coding on three separate wires. These three wires are represented schematically in FIGURE 4 by the line 34 with short diagonals intersecting it. The 3-input majority gate 35 produces the final product bit $S_1$ of next significance.

The adder 10b receives the bits $z_1$ and $z_3$ where $z_1=x_0y_2$ and $z_3=x_1y_1$. The 3-input adder 12a, which corresponds to adder stage 12 of FIGURE 1, adds the three bits $C_2$, $z_6$, where $z_6=x_2y_0$, and the sum bit produced by the two bit adder 10b. The sum bit is present in coded form on the three wires 38. The 3-bit adder 12a produces an output carry $C_{3a}$ and an output sum bit represented by the coding on three wires 40. Majority gate 42 produces the final product bit $S_2$ of next significance.

The remainder of the operation of the circuit of FIGURE 4 should be clear from the discussion up to this point. Reference may also be made to the copending Wang application in this connection.

Additional time may be saved in performing a multiplication by employing, rather than 3-input adders 4, 5 or higher number of bit adders. For example, adders of the class shown in FIGURES 2 and 3 may be used throughout in the design of a multiplier of the type shown in FIGURE 4. An adder such as shown in FIGURE 3 may advantageously be employed to add in one stage delay the four bits needed to obtain the bit $S_2$ and also the four bits needed to obtain the bit $S_3$ for example, and this would speed up the circuit. A 5-input majority gate, with one input fixed at 0, would be used to decode the outputs of these adders. However, the higher number of bit adders employ gates with greater fan-ins and, as pointed out in the Wang application, this makes the tolerance problem more severe. It is also possible in the multipliers of the present application to perform some of the logical product calculations within the adders, as in the Wang application, to speed up the operation still further.

Figure 5:
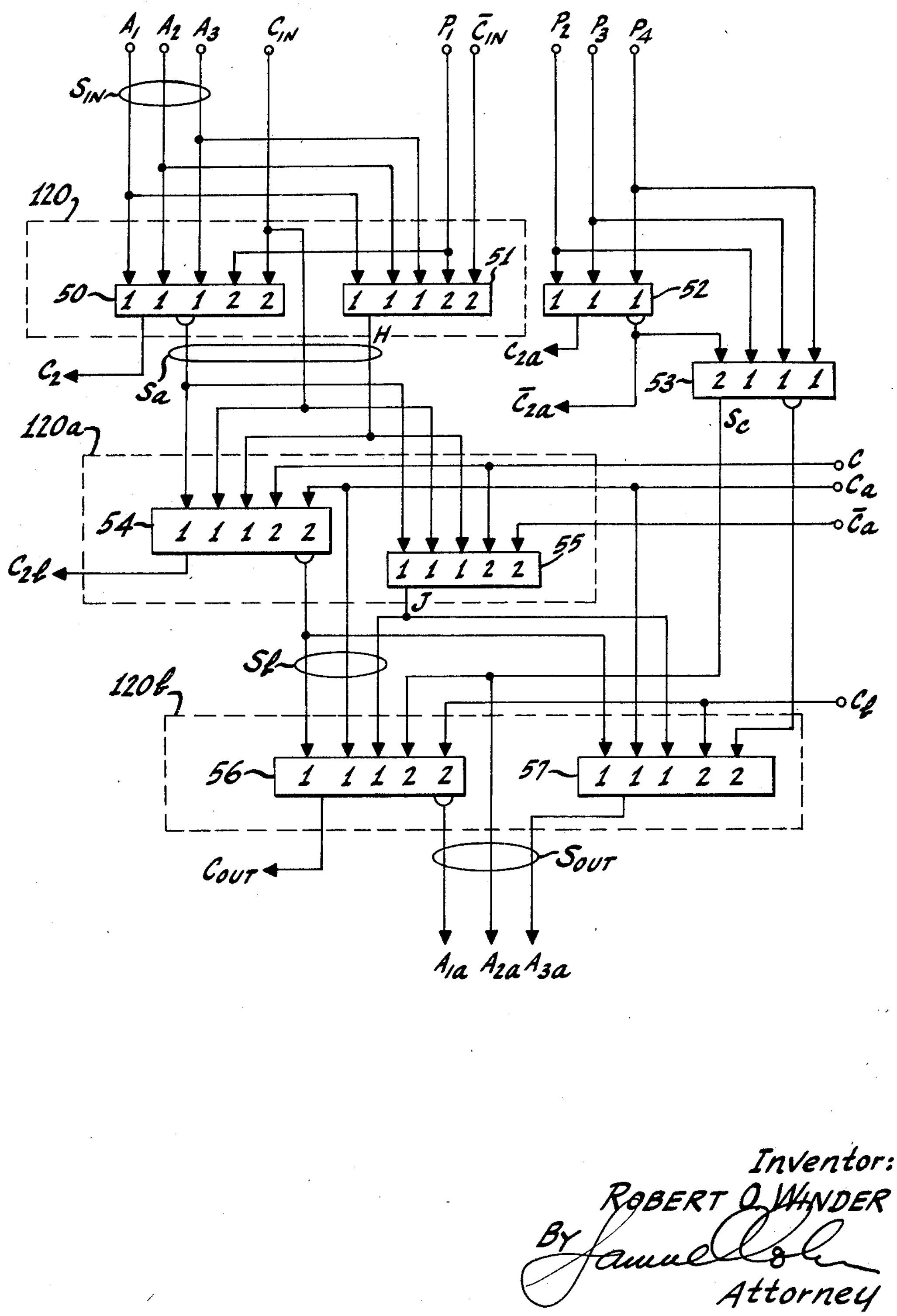
FIGURE 5 is a block diagram of a "nine input" adder module according to the invention which is suitable for sequential multiplication.

FIGURE 5 shows a module consisting of 8 interconnected threshold gates which is suitable for adding 9 bits to one another. A module of this type is useful, for example, in the multiplier of the Wang application above. It also is useful as a stage in a sequential multiplier of the type described in FIGURE 16 of copending application Ser. No. 567,344, titled, "Threshold Gates and Circuits," filed July 13, 1966, by the present inventor.

The circuit of FIGURE 5 includes 8 threshold gates. Six of the gates 50, 51, 54, 55, 56 and 57 are 5-input 2,2,1,1,1 gates with a threshold of 4. Gate 52 is a 3-input majority gate. Gate 53 is a 4-input 2,1,1,1 gate with a threshold of 3. The pairs of gates 120 (gates 50 and 51), 120a (gates 54 and 55), and 120b (gates 56 and 57) correspond to the adder stage 12 of FIGURE 1. Each such pair of gates receives a sum bit consisting of signals on three separate wires and two other bits. The remaining adder stage comprises gates 52 and 53 and this stage receives three input bits $P_3$, $P_4$ and $P_2$, each on a single wire, and produces a sum output $S_c$ and a carry output $C_{2a}$ and their respective complements. This adder stage 52, 53 produces the sum in two gate delay intervals, however, no time is lost since the sum bit $S_3$ is not needed earlier, as should be evident from observation. This adder is employed in this particular configuration as it is convenient here to handle a sum bit appearing on a single wire rather than one which is in coded form on three wires.

The circuit of FIGURE 5 adds the following 9 bits: $S_{IN}$ (which has the value 1 when two or more of the three bits $A_1$, $A_2$, $A_3$ have the value 1), $C_{IN}$, $P_1$, $P_2$, $P_3$, $P_4$, C, $C_a$ and $C_b$. In one particular application of the circuit, $P_1$ through $P_4$ are logical product bits. $C_{IN}$, C, $C_a$ and $C_b$ are carry bits produced by preceding circuits and $S_{IN}$ is an encoded sum bit produced in a preceding circuit. The circuit of FIGURE 5 produces as outputs an encoded sum bit $S_{OUT}$ which again has the value 1 when two of the three bits $A_{1a}$, $A_{2a}$, $A_{3a}$ have the value 1 and four carry bits $C_2$, $C_{2a}$, $C_{2b}$, $C_{OUT}$.

In the operation of the circuit of FIGURE 5, the threshold gate pair 120 adds together $S_{IN}$, $P_1$ and $C_{IN}$ and produces an output carry bit $C_2$ and an encoded sum bit $S_a$. The threshold gate pair 120a adds together the encoded sum bit $S_a$ and the two carry bits C and $C_a$ and produces an output carry bit $C_{2b}$ and an encoded output sum bit $S_b$. The pair of gates 52, 53 add together the three bits $P_2$, $P_3$, $P_4$ and produce an output carry bit $C_{2a}$ and an output sum bit $S_c$. The gate pair 120b adds together the encoded sum bit $S_b$, the single sum bit $S_c$ and the third input carry bit $C_b$ to produce an encoded sum bit $S_{OUT}$ which is the sum of all 9 input bits to the circuit of FIGURE 5 and also produces the fourth output carry bit $C_{OUT}$.

As in the other circuits of the present application, the circuit of FIGURE 5 has the important advantage that it is of very high speed. The 9-input bits are added together in only three threshold gate delay intervals. In one application, the input carries C, $C_a$ and $C_b$ occur during three successive delay intervals and therefore the circuit speed, in terms of numbers of gate delay intervals, is optimal. Moreover, the circuit is relatively simple in that it employs only 8 gates of which 6 are identical.

With minor circuit redesign, a 9-input adder similar to the one of FIGURE 5 can be designed using all identical threshold gates. It is also possible, with minor circuit modification, to provide adders in accordance with the present invention which add a greater or lesser number of bits than 9. As one simple example, with the gates 52 and 53 eliminated the circuit of FIGURE 5 becomes a 7-input adder which employs only six threshold gates, all identical.

While for purposes of convenience the various gates with permanent biases of the circuits of this invention are shown to have input terminals to which these biases are applied, it is to be understood that such bias terminals need not be brought out to the "outside world" and in fact need not even be physically present. To illustrate, a 5-input 1,1,1,1,1 threshold gate with no bias and with a threshold of 2 is the logical equivalent of the 6-input 2,1,1,1,1,1 threshold gate 26 of FIGURE 2 which has a threshold of 4 with a permanent bias 1 applied to the weight 2 input terminal thereof. As another example, a 5-input 1,1,1,1,1 threshold gate with no bias and a threshold of 4 is the logical equivalent of the 7-input gate 24 of FIGURE 2 of input weights 2,1,1,1,1,1,1 having a threshold of 4 and a permanent bias of 0 applied to the weight 2 input terminal thereof. Many other logical equivalents are also possible for the above and other of the gates shown, as understood by those skilled in this art, and it is intended that the claims cover such equivalents.

What is claimed is:

1. A threshold gate adder comprising:
- a plurality of threshold gates;
- input means coupled to said gates for applying thereto, in parallel, signals indicative of a plurality of bits to be added;
- means for deriving from said gates in one gate delay intervals a first signal indicative of a carrying of said bits and a group of signals indicative of the sum of said bits;
- means providing a plurality of signals indicative of other bits; and
- means including a second plurality of threshold gates receptive of said group of signals indicative of the sum of said bits and said signals indicative of other bits for producing, in one gate delay interval, a group of signals indicative of the sum of the bit represented by said group of signals and said other bits.

2. A threshold gate adder as set forth in claim 1, wherein said input means applies to one of said gates as an input indicative of one of said bits a group of signals indicative of said one bit.

3. A threshold gate adder as set forth in claim 1, wherein said plurality of threshold gates consists of two 3-input gates, each input of weight 1, and each gate having a threshold of 2; wherein said means coupled to said gates applies signals indicative of two bits to both gates, a signal indicative of a third bit to the first of said gates and a signal indicative of the complement of the third bit to the second of said gates; and wherein said last-named means comprises an output terminal at said first gate at which a signal indicative of the majority function is obtained, said signal comprising said carry signal, and leads carrying a group of signals indicative of the sum of said bits, said group consisting of a first signal derived from said first gate indicative of the minority function, a second signal which is the signal indicative of said third bit applied to said first gate, and a third signal derived from said second gate indicative of the majority function.

4. A threshold gate added as set forth in claim 1, wherein said plurality of threshold gates consists of two 5-input threshold gates with inputs of respective weights 2,2,1,1,1 and each such gate having a threshold of 4.

5. A threshold gate adder as set forth in claim 1, wherein said plurality of threshold gates consists of three threshold gates, the first a 5-input gate each input of weight 1 and having a threshold of 3, and the second and third each 6-input gates with input weights 2,1,1,1,1,1 and having a threshold of 4.

6. A threshold gate adder as set forth in claim 1, wherein said plurality of threshold gates consists of 4 threshold gates, the first a 7-input gate each input of weight 1; the second an 8-input threshold gate of input weights 4,1,1,1,1,1,1,1 and having a threshold of 6, and the third and fourth each 8-input threshold gates of input weights 2,1,1,1,1,1,1,1 and having a threshold of 5.

7. A threshold gate adder stage comprising:
- two 5-input threshold gates having input weights of 2,2,1,1,1 respectively and a threshold of 4;
- means for applying a group of three signals indicative of a first bit to the three weight 1 input terminals of each gate, respectively;
- means for applying a signal indicative of a second bit to a weight 2 input terminal of each gate, respectively;
- means for applying a signal indicative of a third bit to the remaining weight 2 input terminal of the first gate and a signal indicative of the complement of said third bit to the remaining weight 2 input terminal of the second gate; and
- means for deriving from said two gates an output indicative of the sum of the three bits represented by signals applied to the two gates comprising: three signal leads, one from the first gate at which a signal indicative of the bit 1 appears only when the threshold of the first gate is not reached, the second from the weight 2 input terminal of the first gate which receives the third bit, and the third from the second gate on which a signal indicative of the bit 1 appears only when the threshold of the second gate is reached.

8. In a threshold gate adder:
- a first plurality of threshold gates;
- means coupled to said gates for applying thereto, in parallel, signals indicative of a plurality of bits to be added;
- means for deriving from said gates in one gate delay interval a first signal indicative of the carry of said bits and a group of signals indicative of the sum of said bits;
- a second plurality of threshold gates, each connected to receive said group of signals indicative of the sum of said bits;
- means for applying to said second plurality of threshold gates, in parallel, a plurality of signals indicative of bits to be added to said sum; and
- means for deriving from said second plurality of gates, in one gate delay interval, a signal indicative of a carry and a group of signals indicative of the sum of the bits represented by the signals applied to said second plurality of threshold gates.

References Cited

UNITED STATES PATENTS

| | | | |
|---|---|---|---|
| 2,941,721 | 6/1960 | Schart et al. | 235—175 |
| 3,198,939 | 8/1965 | Helbig et al. | 235—176 X |
| 3,249,746 | 5/1966 | Helbig et al. | 235—176 X |
| 3,275,812 | 9/1966 | Coates et al. | 235—176 X |
| 3,350,685 | 10/1967 | Lindamen | 235—175 X |

OTHER REFERENCES

Schmookler: "Threshold Carry Look-Ahead for Parallel Binary Adder"—IBM Technical Disclosure Bulletin—vol. 7, No. 6, November, 1964.

EUGENE G. BOTZ, Primary Examiner

J. F. RUGGIERO, Assistant Examiner

U.S. Cl. X.R.

235—175